United States Patent
Kyle

[11] Patent Number: 5,931,921
[45] Date of Patent: Aug. 3, 1999

[54] SYSTEM FOR CD-ROM AUDIO PLAYBACK UTILIZING BLOCKING OF DATA WRITING, RESUMING WRITING RESPONSIVE TO DETECTING DATA IN RESPONSE TO DIFFERENCE BETWEEN DESIRED ADDRESS AND PRESENT ADDRESS

[75] Inventor: Michael G. Kyle, Boulder, Colo.

[73] Assignee: LSI Logic Corporation, Milpitas, Calif.

[21] Appl. No.: 08/672,796

[22] Filed: Jun. 28, 1996

[51] Int. Cl.$^6$ ........................................ G06F 13/38
[52] U.S. Cl. .................. 710/29; 710/20; 710/52; 710/53; 710/57
[58] Field of Search .................... 795/823, 824, 795/872, 873, 874, 875, 876, 877; 710/3, 4, 52, 53, 54, 55, 56, 57

[56] References Cited

U.S. PATENT DOCUMENTS

| | | | |
|---|---|---|---|
| 5,249,271 | 9/1993 | Hopkinson et al. | 395/250 |
| 5,274,779 | 12/1993 | Stewart et al. | 395/425 |
| 5,420,839 | 5/1995 | Tateishi | 369/32 |
| 5,444,687 | 8/1995 | Okumura | 369/50 |
| 5,450,546 | 9/1995 | Krakirian | 395/250 |
| 5,536,353 | 7/1996 | Henley et al. | 370/60.1 |
| 5,546,600 | 8/1996 | Miyamae et al. | 395/800 |

FOREIGN PATENT DOCUMENTS

| | | | |
|---|---|---|---|
| 0429139 | 5/1991 | European Pat. Off. | G11B 7/00 |
| 0469553 | 2/1992 | European Pat. Off. | G11B 7/09 |
| 0535832 | 9/1992 | European Pat. Off. | G11B 20/00 |
| 0517473 | 12/1992 | European Pat. Off. | G11B 20/12 |
| 0708443 | 4/1996 | European Pat. Off. | G11B 20/10 |
| 2247331 | 2/1992 | United Kingdom | G11B 20/18 |
| 9524035 | 9/1995 | WIPO | G11B 20/12 |

*Primary Examiner*—Thomas C. Lee
*Assistant Examiner*—Chien Yuan
*Attorney, Agent, or Firm*—David K. Lucente

[57] ABSTRACT

The present invention includes a method of providing data to a memory device to be read at a first frequency comprising the steps of writing data to a memory device at a second frequency; blocking the writing of data after a predetermined amount of data is written; and writing data to the memory device in response to an address. Also included is a monitor circuit comprising a monitor state machine coupled to receive inputs including a comparison result, count signals and a load enable, and configured to output a data enable signal in response to the inputs.

28 Claims, 2 Drawing Sheets

SYSTEM FOR CD-ROM AUDIO PLAYBACK UTILIZING BLOCKING OF DATA WRITING, RESUMING WRITING RESPONSIVE TO DETECTING DATA IN RESPONSE TO DIFFERENCE BETWEEN DESIRED ADDRESS AND PRESENT ADDRESS

FIELD OF THE INVENTION

The present invention relates to digital audio playback, and particularly to maintaining continuous audio playback from a digital medium.

BACKGROUND OF THE INVENTION

Compact discs (CDs) were launched as vehicles for audio. Their high data storage capabilities and low data error rates make them well suited for computer use. Consequently, the CD evolved into the CD read-only memory (CD-ROM). The high data storage capability of the CD-ROM allows it to store large amounts of text, graphics, audio, and even video.

CD audio remains a required legacy for computer CD-ROM drives, i.e., the drives must have an audio playback capability. This requirement, however, complicates the data controller of the drive. A 176,400 bytes per second data transmission frequency is required to provide proper playback of CD audio. In typical CD drives, this is the data transmission frequency from the CD.

However, frequencies as high as 2,822,400 bytes per second (16×176,400) are possible, and highly desirable, for non-audio (e.g. text, graphics, video). Ideally, a CD-ROM drive should support a 1×–16× frequency range for data transmission. Implementing a CD-ROM drive that provides this frequency range has to overcome many technical obstacles. Some of the obstacles are related to the analog processing of the audio data as it is received from the CD-ROM. These obstacles, if overcome, would add an unacceptable expense to mass-produced drives.

A digital video disk (DVD) can store up to eight times more information than a CD-ROM. With an appropriate DVD drive, a computer can play full-length, full-screen movies from a DVD. With the vast amount of information per unit time required for movie playback, a data transmission frequency from a DVD is greater than the continuous audio playback frequency. Thus, the lower end of the data transmission frequency range for the DVD drive may be constrained to a value many times that of the continuous audio playback frequency.

One approach is to decrease the data transmission frequency range of the drive. Nonetheless, it is desirable to provide as high a data transmission frequency as possible for quick data retrieval. Therefore, the low end of the data transmission frequency range will typically be greater than 1×. In such an approach, the data is provided from the CD-ROM at a frequency typically several times faster than 1×. However, a lower frequency (1×) is required for proper audio playback.

One technique to reduce the data transmission frequency to the playback frequency uses a buffer. The buffer is written with data at the data transmission frequency, and is read at the playback frequency. Since the buffer data is read at a slower frequency that the data was written, the buffer will fill up. This technique will stop providing data when the buffer is filled with data.

Once the buffer is capable of receiving more data, the drive circuitry between the CD-ROM and buffer starts writing data again. Still, a necessary requirement for audio playback is that it must be uninterrupted. Thus, the audio data read from the buffer must be the audio data immediately following the last data read. This is to prevent audio data overlaps or gaps. Otherwise, the audio playback will be interrupted and not sound "continuous." A mechanism for determining an absolute location in the audio data stream is therefore required. This requirement is met by searching the buffer for the data immediately following the last data read. In this way, the data controller circuitry reads the audio data uninterrupted.

This technique has several disadvantages. One disadvantage is searching the buffer for the data immediately following the last data read reduces the bandwidth of the data controller. Further, the searching function must be performed by either additional hardware or firmware. Another disadvantage is that the unused data written to the buffer uses valuable buffer space. Further, this unused data may be a large amount so that time is wasted searching through it. Also, the unused data amount may be so large that the sought address is not written to the buffer, and more time must be spent filling the buffer and then searching for the correct data address. These disadvantages can cause an unacceptable interrupt in the audio playback.

There remains a need for a CD-ROM drive that can provide high data transmission frequencies for non-audio data retrievals while still providing uninterruptable audio playback and yet be economical. The present invention meets this need.

SUMMARY OF THE INVENTION

The present invention includes a method of providing data to a memory device to be read at a first frequency comprising the steps of writing data to a memory device at a second frequency; blocking the writing of data after a predetermined amount of data is written; and writing data to the memory device in response to an address.

The present invention also includes a monitor circuit comprising a monitor state machine coupled to receive inputs including a comparison result, count signals and a load enable, and configured to output a data enable signal in response to the inputs. The monitor circuit also includes a comparator circuit for comparing addresses and outputting the comparison result. The monitor circuit also preferably includes a counter to provide the load enable signal.

Numerous other advantages and features of the present invention will become readily apparent from the following detailed description of the invention and the embodiments thereof, from the claims and from the accompanying drawings in which details of the invention are fully and completely disclosed as a part of this specification.

DETAILED DESCRIPTION OF THE PREFERRED EMBODIMENT

Figure 1:
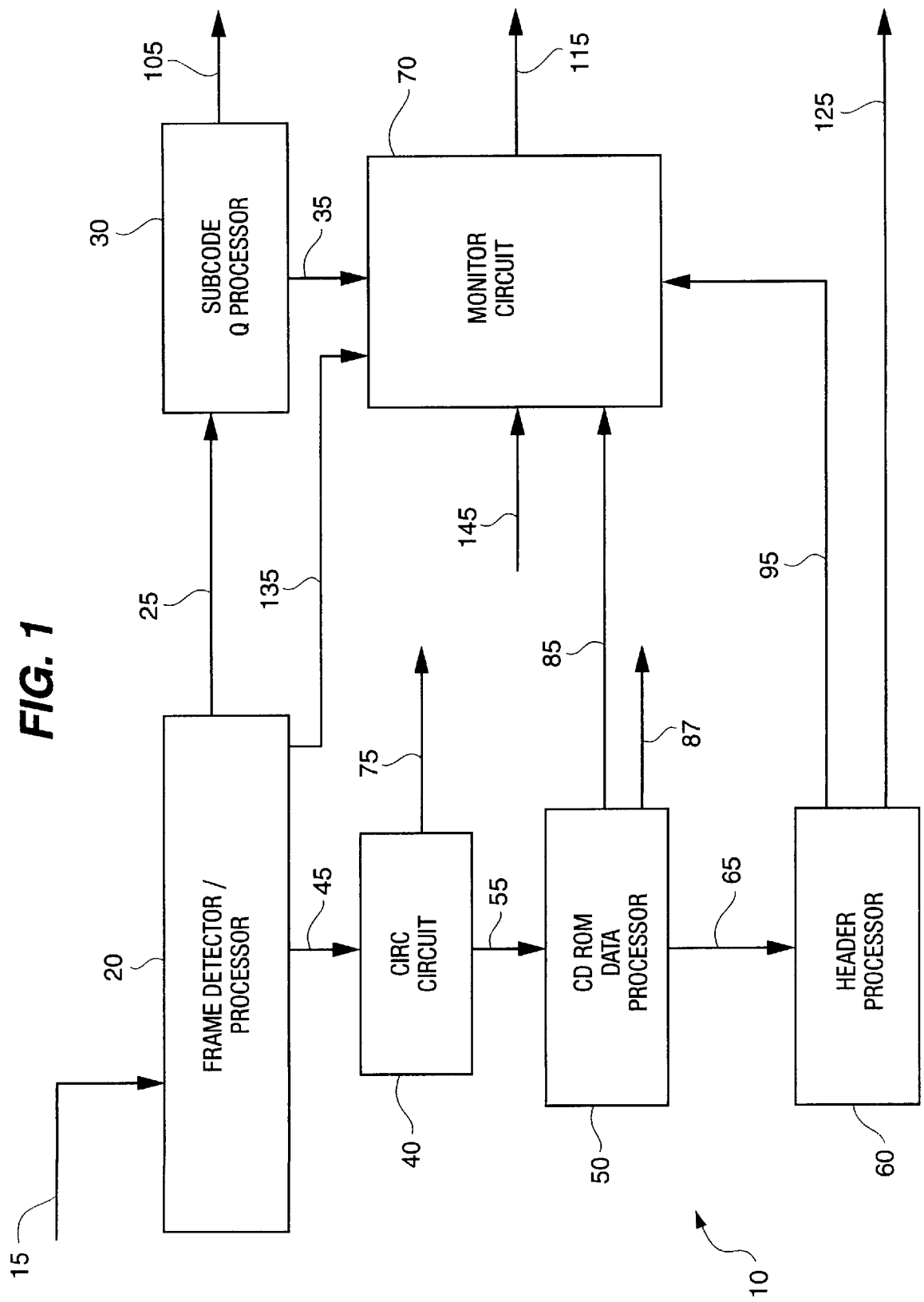
FIG. 1 is a block diagram of a data controller that includes a monitor circuit according to the present invention.

While this invention is susceptible of embodiment in many different forms, there is shown in the drawings and will be described herein in detail a specific embodiment thereof with the understanding that the present disclosure is to be considered as an exemplification of the principles of the invention and is not to be limited to the specific embodiment described.

FIG. 1 illustrates a data controller 10 that incorporates the present invention. It is preferred that data controller 10 is incorporated into a CD-ROM drive. Generally, data controller 10 includes a frame detector/processor 20, a subcode processor 30, a CIRC circuit 40, a CD-ROM data processor 50, a header processor 60 and a monitor circuit 70.

Data controller 10 is coupled to retrieve digital data at a first frequency. Briefly, digital data is scanned from a CD-ROM (not shown) by the data controller 10. This data is then amplified and converted into a corresponding analog signal. The analog signal is converted into a digital data signal that is synchronized to a frequency of controller 10. The digital data signal is denoted as a "frame." A typical frame includes the following ordered subframes: a 27 bit sync pattern with 3 padding bits; 17 bits with padding bits typically referred to as a "subcode"; 204 bits of data with padding bits that include audio or non-audio data; 68 bits of error correction with padding bits; 204 bits of data with padding bits that include audio or non-audio data; and 68 bits of error correction with padding bits.

Frame detector/processor 20 of data controller 10 receives the frame via a lead 15. Frame detector/processor circuit 20 is programmed to detect the sync pattern of the received frame. The programming preferably provides a value that represents a minimum number of good sync patterns detected and a value representing a minimum number of sync patterns not detected when expected. Both these values are more preferably between four to ten, with a preferred range between one to two hundred fifty-six. These values represent the minimum number of frames required to detect the presence or absence of synchronization.

After power-up, frame detector/processor 20 searches for a consecutive minimum number of good sync patterns as programmed. Once synchronization is established, frame detector/processor 20 maintains where a good sync bit should occur. Frame detector/processor 20 interrupts a digital processor (not shown) once the minimum number of sync patterns not detected has occurred. The digital processor is preferably an Intel-compatible 80C32 microcontroller.

The padding bits of the received frame were added during data eight-to-fourteen modulation (EFM) to ensure that a maximum of ten 0s and minimum of two 0s appear between a 1 in the EFM data. These bits are also used to provide suppression of the low frequency component of an audio signal represented by the CD-ROM data, by maintaining the signal's digital sum value as close as possible to zero. Frame detector/processor 20 removes these padding bits.

Frame detector/processor 20 preferably includes three bit counters to keep track of incoming frame data. The first counter counts the bits of the incoming frame, and is reset after reaching the end of each subframe. The second counter keeps track of the present subframe. The value in the second counter is incremented in response to the first counter resetting. The third counter keeps track of the bits in the subcode subframe. The counters' outputs (bit_cnt, smb_cnt and frm_cnt) are also used by CIRC circuit 40, the subcode Q processor 30 and the monitor circuit 70. Frame detector/processor 20 also includes a comparator to compare incoming frame data with the frame synchronization word, a shift register to shift in frame data and a 14-bit register to latch the frame data.

The latched 14 bits of frame data that, at various times, includes audio (or non-audio), subcode and error correction data are next routed to an EFM demodulator preferably included in the frame detector/processor 20. This demodulator is preferably a combinatorial logic implementation of a conventional demodulation look up table. The frame data are demodulated from 14 bits to 8 bits. Any latched data that does not match a term in the look up table is output as 00 Hex. The demodulated audio (or non-audio), subcode and error correction data are output to CIRC circuit 40. Subcode data is also sent to subcode Q processor 30. Preferably, known subcode S0 and S1 synchronization words are also detected in frame detector/processor 20. Signals representing the detection of these synchronization words are provided as output to subcode Q processor 30 via a lead 25.

The subcode includes 8 subcode bits, designated as P,Q, R,S,T,U,V, and W. Each bit position represents a channel. However, information carried by these channels cannot be determined until multiple frames are processed. Conventionally, this requires processing ninety-eight frames into a block or sector. The information in each subcode block includes synchronization, instruction, data commands and error correction data. Channels P and Q are output to subcode Q processor 30 and channels R-W are output to CIRC circuit 40. As each frame subcode is received by subcode Q processor 30, a cyclic redundancy check (CRC) is performed, and errors are flagged. The Q channel information is then stored in special function registers of a digital processor, such as a microcontroller, into bytes.

Subcode Q processor 30 also preferably includes a sync detection circuit which checks for the presence and correct location of the S0 and S1 synchronization pattern. The 8-bit demodulated data received from frame detector/processor 20 are checked for the S0 and/or S1 sync patterns based on the programmed values representing a minimum number of good sync patterns detected (preferably four to ten) and representing a minimum number of sync patterns not detected when expected (preferably four to ten). Once sync is detected, the circuit begins collecting 8-bit Q subcode data. The Q channel data is separated from the remaining subcode channel data, output via a lead 105 and stored in the special function registers of the microcontroller. The Q channel data includes absolute frame address information in the value format minute:second:frame (the frame represents 1/75 of a second). These values are respectively designated as AMIN, ASEC and AFRAME. The term "frame" in the format minute:second:frame corresponds to a subcode block or sector that occurs seventy-five times a second. The P channel data is preferably discarded.

At the end of each block (that is, ninety-eight frames), a 16-bit CRC check is preferably performed on the Q channel data according to a preferred polynomial: $X^{16}+X^{12}+X^5+1$. A signal Q_crc is generated in response to this CRC check. Q channel data is then sent via lead 105 to the buffer memory manager for storage in RAM. If the CRC check fails, the microcontroller is also interrupted. The values for AMIN, ASEC and AFRAME are also written to special function registers of the microcontroller. These values are saved or updated, preferably in registers, at the same rate the blocks are written to the buffer, e.g. 3x.

CIRC circuit 40 performs conventional de-interleaving, error correcting and reordering on the demodulated data received from frame detector/processor 20. Levels 1 and 2 error correction are preferably provided by CIRC circuit 40. Audio data is output to a buffer manager via a lead 75 to the buffer memory manager in preferred 4-byte blocks. CIRC circuit 40 processes ninety-eight frames of non-audio data into, and outputs, one data block or sector. The data block includes, in order: twelve bytes of synchronization data; a 4-byte header; 2048 bytes of data; eight bytes for error detection; eight blank bytes; and two hundred seventy-two bytes for error correction.

Each non-audio data block or sector is also output to CD-ROM data processor 50. Included in CD-ROM data processor is a sync detector. The sync detector detects the 12-byte synchronization data provided for each block or sector. This synchronization data typically is in the form of 1 byte of 0s, followed by 10 bytes of 1s, followed by 1 byte of 0s. The sync detector detects this synchronization pattern and provides a sync signal to other circuitry in CD-ROM data processor 50.

The sync detector monitors incoming data from CIRC circuit 40 and locks onto valid synchronization data. Valid synchronization data causes a preferred sync counter to be incremented. The sync counter output is compared with the value representing the minimum number of sync patterns necessary to be in sync. Once this value is reached, a signal representing that synchronization has been achieve is generated. After synchronization, CD-ROM data processor 50 continues to monitor the location of expected good synchronization data.

Each occurrence of missed synchronization data will increment a preferred sync error counter. The value in the sync error counter is compared with the value representing the minimum number of sync patterns not detected where expected. Once this value is reached, a sync error signal is output to interrupt the microcontroller. A byte counter is used to keep track of which byte of the incoming sector was currently received. A signal byte_cnt is output from the counter to lead 85. At the end of each valid sector, a sect_end signal is issued to the buffer memory manager and the microcontroller is interrupted.

CD-ROM data processor 50 also preferably includes a byte swap circuit. Briefly, the data coming off the disk is formatted such that the byte order of each even-odd numbered pair of bytes is reversed. The byte swap circuit is responsible for reordering the data. The microcontroller can signal the byte swap circuit to disable the byte swapping function.

The byte swap circuit preferably employs three 8-bit registers. Data is latched into the registers as follows: If data is an even numbered byte, then (1) shift register 2 value to register 3, (2) shift register 1 value to register 2, and (3) latch incoming data into register 1; or if data is an odd numbered byte, then (1) shift register 2 value to register 3, and (2) latch incoming data into register 2. Register 3 holds the swapped output data which is sent to a descrambler circuit.

CD-ROM data processor 50 also preferably includes the descrambler circuit. All of the data in a sector except for the synchronization field are scrambled using a 15-bit shift register with feed back and preferably according to a polynomial $X^{15}+X+1$. The output of the scramble register is then exclusive-ORed with the incoming CD-ROM non-audio data in serial form. The scramble register is preset with the value of 0001 Hex. This same polynomial is used to descramble the data by the descrambler circuit.

Non-audio data requires a lower error rate tolerance. CD-ROM data processor 50 further provides a third level of error correction to meet this tolerance. This third level of error detection preferably includes CRC. A data_crc signal is output in response to error detection of the non-audio data.

The unscrambled, synchronized non-audio data is output from CD-ROM data processor 50 to a header processor 60. As previously described, each sector contains 4 bytes of header information. Included in this information is a 3 byte address and a 1 byte mode. The address bytes contain non-audio data AMIN, ASEC, and AFRAME bytes. The mode byte describes the nature of the data in a sector. The header information is collected in parallel byte form, output via a lead 125 and stored in the microcontroller special function registers and also in the buffer.

Figure 2:
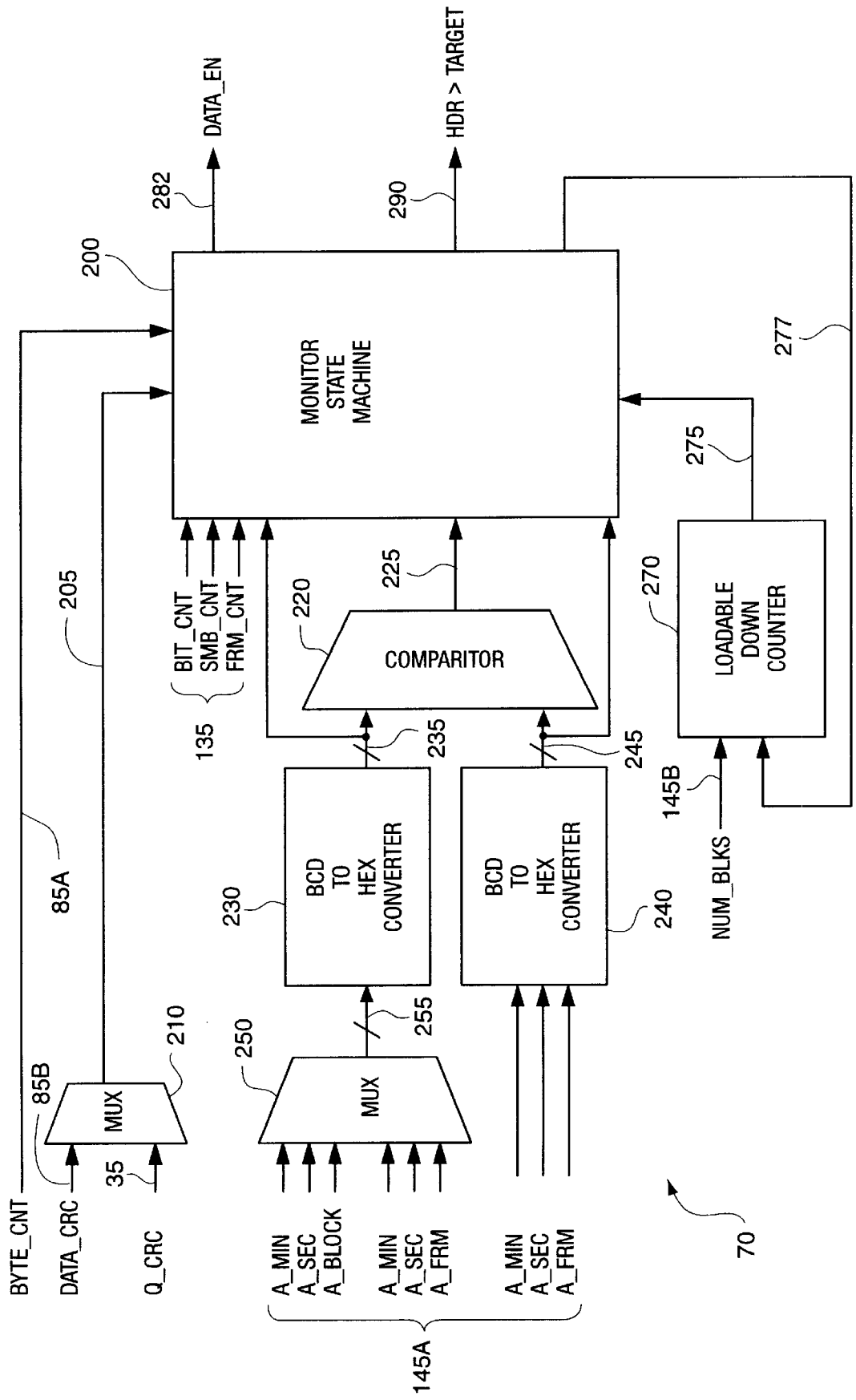
FIG. 2 is a detailed block diagram of the monitor circuit illustrated in FIG. 1.

A detailed block diagram of the monitor circuit 70 according to the present invention is illustrated in FIG. 2. A monitor state machine 200 receives via a lead 85*a* a byte_cnt signal from CD-ROM data processor 50 (FIG. 1). Byte_cnt signal represents the present byte of a non-audio sector or block. Monitor state machine 200 is coupled to a MUX 210 via a lead 205. MUX 210 is coupled to receive Q_crc and data_crc signals from subcode Q processor 30 and CD-ROM data processor 50 via respective leads 35 and 85*b*. These signals indicate that the non-audio and Q subcode data are reliable.

Monitor state machine 200 is also coupled to frame detector/processor 20 via a lead 135. Bit_cnt, smb_cnt and frm_cnt signals are provided over lead 135. Bit_cnt signal represents the bit position in the incoming audio frame or sector. Frm_cnt represents the present subframe in the incoming audio frame. Smb_cnt represents the bit position in the subcode subframe in the incoming audio frame.

Monitor state machine 200 is further coupled to comparator 220 via a lead 225. Monitor state machine 200 and comparator 220 is coupled to converters 230 and 240 via respective leads 235, 245. Converter 230 is coupled to a MUX 250 via a lead 255. MUX 250 and converter 240 are coupled to the microcontroller via lead 145*a*. Lead 145*a* provides to MUX 250 AMIN, ASEC, AFRAME signals for both the non-audio and audio data to be multiplexed onto lead 255. Converter 240 receives AMIN, ASEC and AFRAME signals via lead 145*a* from the special function registers in the microcontroller.

A counter 270 is coupled to monitor state machine 200 via leads 275 and 277. Counter 270 is also coupled to the microcontroller via a lead 145*b*. Monitor state machine 200 preferably outputs two signals via leads 282 and 290.

The operation of monitor circuit 70 with audio data will now be explained with reference to FIG. 2. The microcontroller (not shown) supplies the num_blks signal via lead 145*b* to load counter 270. The num_blks signal represents the number of data blocks to be stored or written to the buffer. The num_blks signal is calculated by the microcontroller in response to a preferred predetermined amount of data that can be written to the buffer. This predetermined amount preferably is the difference between a predetermined full buffer capacity amount and a predetermined empty buffer capacity amount. Counter 270 is a preferred loadable down counter.

As audio data is written to the buffer, monitor state machine 200 receives bit_cnt, smb_cnt and frm_cnt signals from frame detector/processor 20 via lead 135. Bit_cnt signal represents the bit position in the incoming audio frame. Frm_cnt represents the present subframe in the incoming audio frame. Smb_cnt represents the bit position in the subcode subframe in the incoming audio frame. Monitor state machine 200 uses the frm_cnt signal to determine the end of each audio data block.

MUX 210 is also selected to provide Q_crc signal onto lead 205 to monitor state machine 200. Q_crc signal represents whether Q channel subcode data of the audio data is error free. After a 4-byte block of audio data is written to the buffer, monitor state machine 200 provides a signal via lead 277 to decrement counter 270. This process repeats until monitor state machine 200 detects that counter 270 has a preferred value of zero. At this time, a data_en signal, provided on lead 282, is inactivated. The buffer memory detects the inactive data_en signal and stops writing audio data to the buffer.

When enough audio data is read from the buffer, MUX 250 is responsively selected to provide the AMIN, ASEC, AFRAME signals from registers in the microcontroller. These signals correspond to the incoming audio data. These signals, and AMIN, ASEC and AFRAME signals (corresponding to the last audio data written to the buffer) stored in the special function registers of the microcontroller are converted to hexadecimals values by respective converters 230 and 240. These two hexadecimal values are compared in comparator 220. The result of the comparison is provided to monitor state machine 200.

Comparator 220 can either output a signal representing whether the two hexadecimal values are equal or a signal representing the difference between the two hexadecimal signals. If the two hexadecimal values are the same, then monitor state machine 200 monitors frm_cnt signal to determine when the desired audio frame starts and activates data_en signal on lead 282 in response. Concurrently, the microcontroller provides another num_blks signal to counter 270.

If the hexadecimal value for the present AMIN, ASEC, AFRAME signals (of the incoming data) are less than the special function registers AMIN, ASEC, AFRAME signals (corresponding to the data last written to the buffer), comparator 220 outputs a signal that represents this condition. Monitor state machine 200 calculates the actual difference in response to this signal and the hexadecimal values supplied from leads 235, 245. This calculated value, preferably stored and decremented in counter 270, is then used by monitor state machine 200 in association with frm_cnt signal to determine when the desired audio data sector or block is available. Once the availability is determined and the microcontroller provides another num_blks signal to counter 270, Q_en signal on lead 282 is activated.

Optionally, if the hexadecimal value for the present (incoming audio data) AMIN, ASEC, AFRAME signals are greater than the special function registers AMIN, ASEC, AFRAME values, comparator 220 can output a signal that represents this condition. Monitor state machine 200 calculates the actual difference in response to this signal and the hexadecimal values supplied from leads 235, 245. This calculated value is then used by monitor state machine 200 to output a control signal greater_than_target on lead 290 to the microcontroller that the present audio sector is after the desired audio data sector. The control signal can be an interrupt signal to the microcontroller. The microcontroller can then send a signal to the servo logic to move back an optical pick-up a predetermined constant number of tracks. Incoming audio data sectors are then checked for the desired audio sector.

Alternatively, the microcontroller can compare the AMIN, ASEC, AFRAME values in the registers to determine the exact number of tracks that the optical pick-up has to be moved. Simultaneously with the operation of comparator 220 in any of the three modes discussed above, monitor state machine 200 also checks Q_crc signal to ensure that the Q channel subcode data is error free. If not, the next incoming audio data is checked to determine if it includes the desired audio data by checking the corresponding AMIN, ASEC and AFRAME signals.

The operation of monitor circuit 70 with non-audio will now be explained with reference to FIG. 2. The microcontroller (not shown) supplies the num_blks signal via lead 45b to load counter 270. As non-audio data is written to the buffer, monitor state machine 200 receives a byte_cnt signal from CD-ROM data processor 50 via lead 85a. Byte_cnt signal represents the present byte of the non-audio sector or block. Monitor state machine 200 uses the byte_cnt signal to determine the end of each non-audio data block. MUX 210 is also selected to provide data_crc signal onto lead 205 to monitor state machine 200. Data_crc signal represents whether the non-audio data is error free. After a block or sector of non-audio data is written to the buffer, monitor state machine 200 provides a signal via lead 277 to decrement counter 270. This process repeats until monitor state machine 200 detects that counter 270 has a preferred value of zero. At this time, a data_en signal, provided on lead 282, is inactivated. The buffer memory detects the inactive data_en signal and stops writing non-audio data to the buffer.

When enough non-audio data is read from the buffer, the microcontroller provides another num_blks signal to counter 270 to start loading non-audio data. MUX 250 is selected to provide the AMIN, ASEC, AFRAME signals from registers in the microcontroller. These signals correspond to the incoming non-audio data. These signals and AMIN, ASEC and AFRAME signals (corresponding to the last non-audio data written to the buffer) stored in the special function registers of the microcontroller are converted to hexadecimals values by respective converters 230 and 240. These two hexadecimal values are compared in comparator 220. The result of the comparison is provided to monitor state machine 200.

Comparator 220 can output a signal representing whether the two hexadecimal values are equal, or whether one is greater or less than. If the two hexadecimal values are the same, then monitor state machine 200 monitors byte cnt signal to determine when the desired non-audio frame starts and activates data_en signal on lead 282 in response. Concurrently, the microcontroller applies another num_blks value signal to counter 270.

If the hexadecimal value for the present AMIN, ASEC, AFRAME signals are less than the special function registers AMIN, ASEC, AFRAME, comparator 220 outputs a signal that represents this condition. Monitor state machine 200 calculates the actual difference in response to this signal and the hexadecimal values supplied from leads 235, 245. This calculated value is then used by monitor state machine 200 and byte_cnt signal to determine when the desired non-audio data sector or block is available. Once the availability is determined and the microcontroller applies another num_blks value signal to counter 270, data_en signal on lead 282 is activated.

Optionally, if the hexadecimal value for the present AMIN, ASEC, AFRAME signals are greater than the special function registers AMIN, ASEC, AFRAME, comparator 220 can output a signal that represents this condition. Monitor state machine 200 calculates the actual difference in response to this signal and the hexadecimal values supplied from leads 235, 245. This calculated value is then used by monitor state machine 200 to output a control signal on lead 290 to the microcontroller that the present non-audio sector is after the desired non-audio data sector. The control signal can be an interrupt signal to the microcontroller. The microcontroller can then send a signal to the servo logic to move back an optical pick-up a predetermined constant number of tracks. Non-audio data sectors are then checked for the desired non-audio sector.

Alternatively, the microcontroller can compare the AMIN, ASEC, AFRAME values in the registers to determine the exact number of tracks that the optical pick-up has to be moved. Simultaneously with the operation of comparator 220 in any of the three modes discussed above, monitor state machine 200 also checks data_crc signal to ensure that the incoming non-audio data is error free. If not, the next incoming non-audio data is applied to comparator 220 against AMIN, ASEC and AFRAME for the last non-audio data written to the buffer.

The output audio signal from the buffer is a preferred sixteen bit, 44.1 kHz signal. The signal is then provided to, for example, a 64× interpolation sigma-delta modulation circuit, a digital sigma-delta modulator/ 1 bit digital-analog converter circuit and then to headphone or stereo line drivers.

Several advantages are provided by the monitor circuit 70 of the present invention. Data, particularly audio data, is written to the buffer so that uninterrupted and continuous audio playback is achieved. Further, buffer space is efficiently utilized since extra, unusable data is not saved to the buffer.

Numerous variations and modifications of the embodiments described above may be effected without departing from the spirit and scope of the novel features of the invention. It is to be understood that no limitations with respect to the specific device illustrated herein are intended or should be inferred. It is, of course, intended to cover by the appended claims all such modifications as fall within the scope of the claims.

We claim:

1. A method of providing data from a memory device at a first frequency comprising the steps of:
   (a) writing data to a memory device at a second frequency;
   (b) blocking the writing of data after a predetermined amount of data is written;
   (c) writing data to the memory device responsive to detecting data in response to a difference between a desired address and a present address.

2. The method of claim 1 wherein the first frequency is less than the second frequency.

3. The method of claim 1 wherein the data is audio data.

4. The method of claim 1 wherein steps (a) and (c) include writing data to the memory in response to the memory being at a capacity less than a predetermined full capacity.

5. The method of claim 1 wherein the step (c) further includes comparing a desired address to a present address.

6. The method of claim 5 wherein the step (c) further includes detecting data that corresponds to the desired address and outputting an enable signal in response.

7. The method of claim 5 wherein the step (c) further includes writing the data when the desired address is less than the present address.

8. The method of claim 1 wherein the second frequency is in the range of three to sixteen times the first frequency.

9. The method of claim 1 wherein the second frequency is in the range of four to twelve times the first frequency.

10. A method for providing continuous data from a memory comprising the steps of:
    1) reading data from the memory at a first frequency;
    2) writing a predetermined number of data blocks in the memory at a second frequency;
    3) blocking the writing of data after the predetermined number of data blocks are written; and
    4) writing another number of data blocks in the memory responsive to detecting data in response to a difference between address and a present address.

11. The method of claim 10 wherein the first frequency is less than the second frequency.

12. The method of claim 10 wherein the data is audio data.

13. The method of claim 10 wherein steps (b) and (d) include storing data to the memory in response to the memory being at a capacity less than a predetermined full capacity.

14. The method of claim 10 wherein the step (d) further includes comparing a desired address to a present address.

15. The method of claim 14 wherein the step (d) further includes detecting data that corresponds to the desired address and outputting an enable signal in response.

16. The method of claim 14 wherein the step (d) further includes writing the data when the desired address is less than the present address.

17. The method of claim 10 wherein the second frequency is in the range of three to sixteen times the first frequency.

18. The method of claim 10 wherein the second frequency is in the range of four to twelve times the first frequency.

19. A monitor circuit comprising:
    a monitor state machine coupled to receive inputs including a comparison result, count signals and a load enable, and configured to output a data enable signal in response to the inputs; and
    a counter that contains a value that corresponds to a predetermined amount of data that is written.

20. The monitor circuit of claim 19 further comprising a comparator circuit for comparing addresses and outputting the comparison result.

21. The monitor circuit of claim 19 further comprising a counter to provide the load enable signal.

22. The monitor circuit of claim 21 wherein the counter is coupled to receive a value representing a number of data blocks to be written to a memory.

23. The monitor circuit of claim 19 wherein the count signals include a byte count signal that represents the present byte of a non-audio data block.

24. The monitor circuit of claim 19 wherein the count signals include a bit count signal that represents a bit position in an audio block.

25. The monitor circuit of claim 19 wherein the count signals include a subcode count signal that represents a bit position in a subcode subframe of an audio block.

26. The monitor circuit of claim 19 wherein the count signals include a frame count signal that represents a present subframe in an audio frame.

27. A data controller comprising a monitor circuit that blocks writing of data after a predetermined amount of data is written and writes another amount of data blocks in the memory responsive to detecting data in response to a difference between a desired address and a present address.

28. The data controller of claim 19 incorporated with a CD-ROM drive.

* * * * *